Nov. 18, 1930.  L. W. EVERSMAN  1,781,919
BEET HARVESTER
Filed Dec. 19, 1927   3 Sheets-Sheet 1

Inventor
LEWIS W. EVERSMAN
By
Attorney

Nov. 18, 1930.    L. W. EVERSMAN    1,781,919
BEET HARVESTER
Filed Dec. 19, 1927    3 Sheets-Sheet 3

Inventor
LEWIS W. EVERSMAN
By
Attorney

Patented Nov. 18, 1930

1,781,919

UNITED STATES PATENT OFFICE

LEWIS W. EVERSMAN, OF JULESBURG, COLORADO

BEET HARVESTER

Application filed December 19, 1927. Serial No. 240,971.

This invention relates to a beet topper and digger and has for its principal object the provision of a simple and efficient machine which will accurately cut the tops from the beets while they are still in the ground, and then dig and pile the topped beets in suitable piles.

Another object of the invention is to provide an efficient mechanism which will gage the topping mechanism so as to cut a top of uniform thickness regardless of the depth or projection of the beet in the ground.

Another object is to provide means for aligning the topping mechanisms with the beet regardless of its lateral position in the row.

Still another object is to provide means for gathering and holding the beet foliage in proper position for cutting the tops.

Further object of the invention is to provide means for removing the cut tops from the path of the digging mechanism.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

Figure 1:
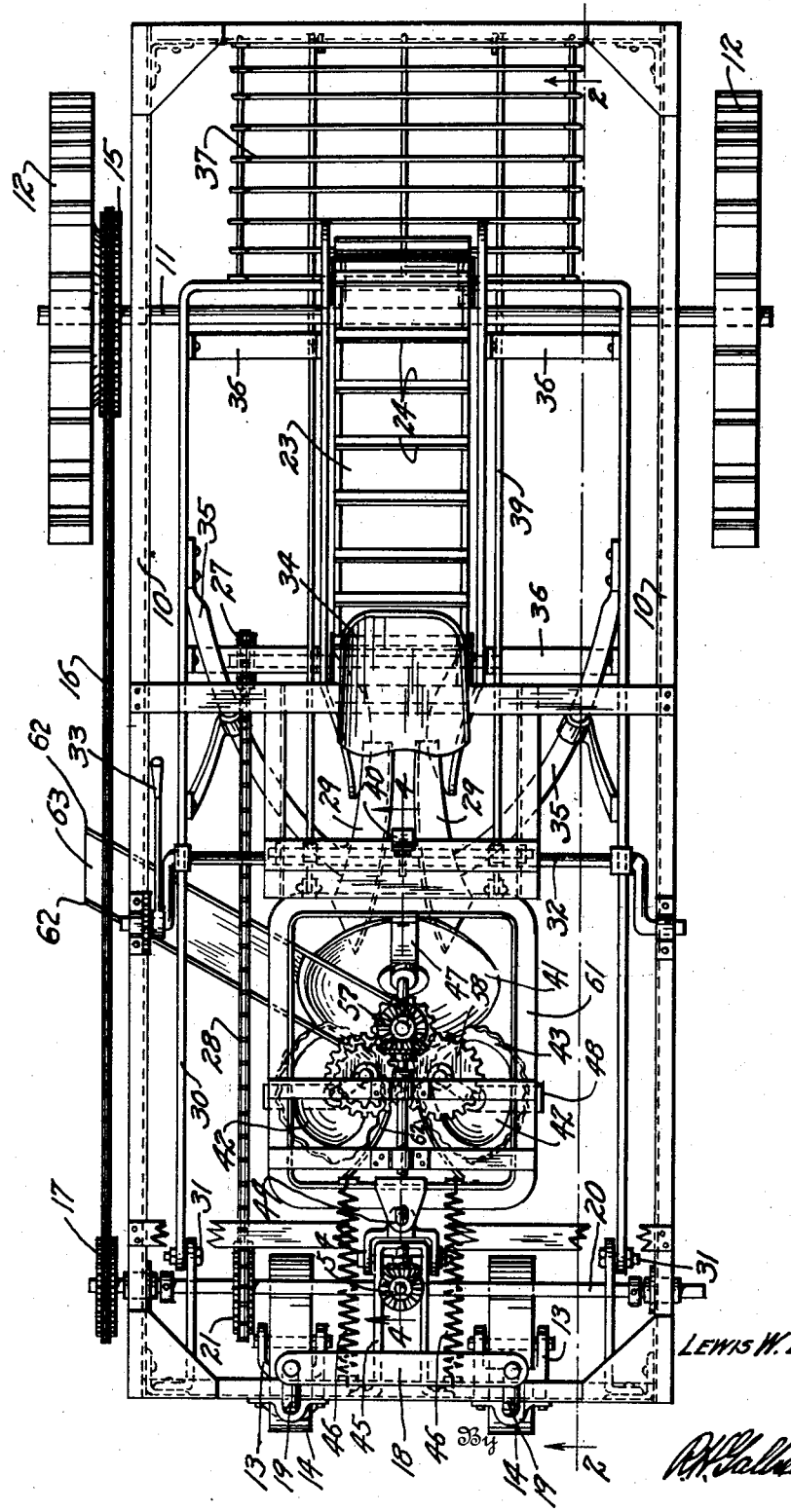
Fig. 1 is a plan view of my improved beet topper and digger.
Figure 2:
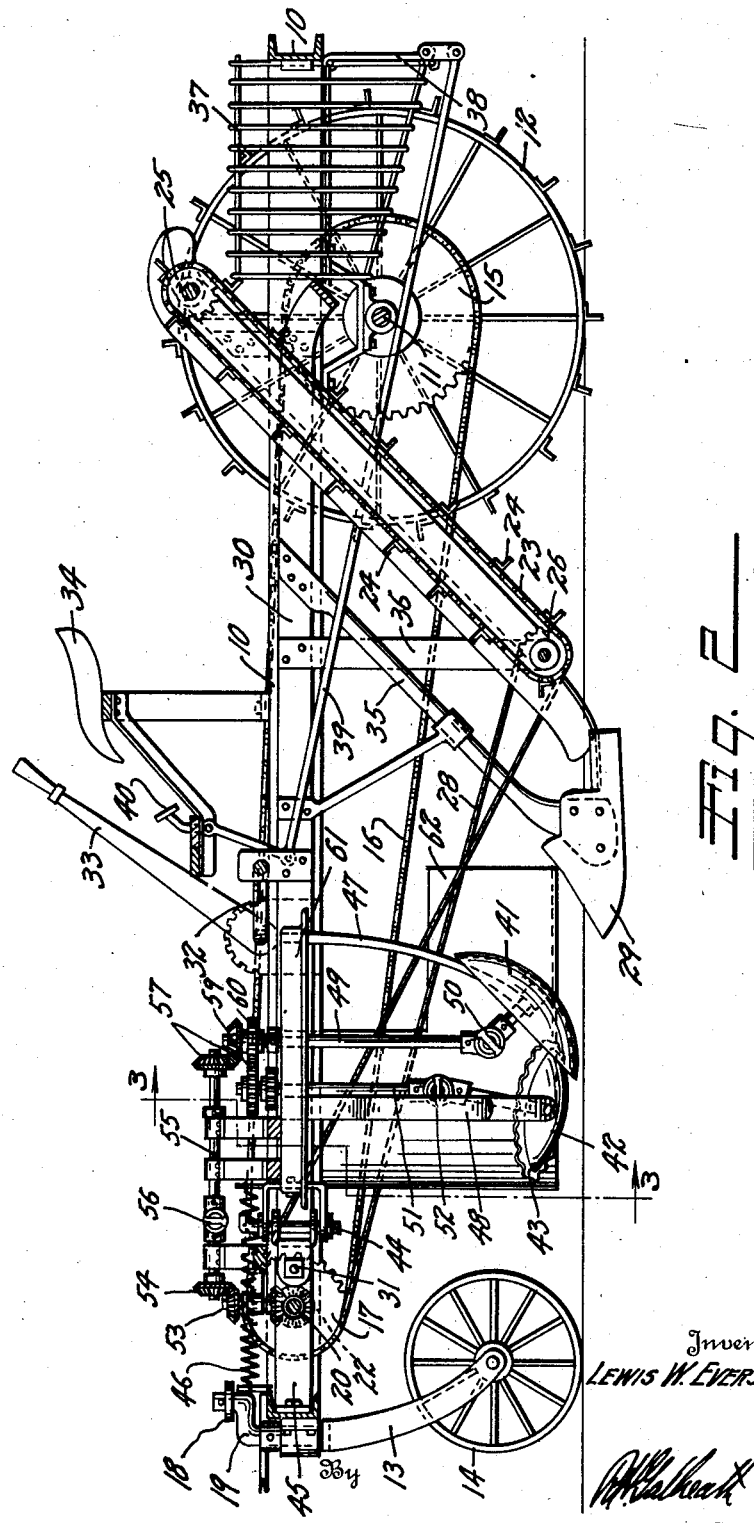
Fig. 2 is a longitudinal section therethrough taken on the line 2—2, Fig. 1.
Figure 3:
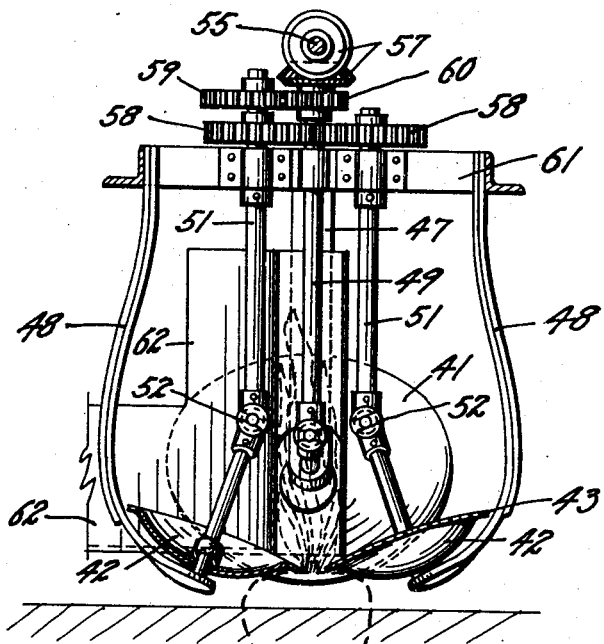
Fig. 3 is a detail cross section taken on the line 3—3, Fig. 2.
Figure 4:
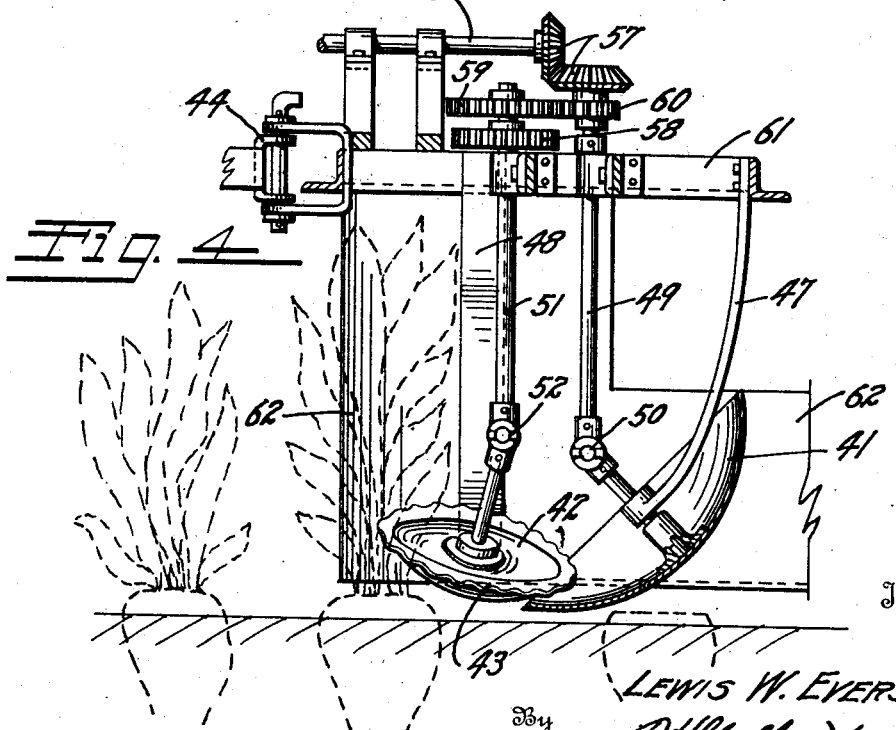
Fig. 4 is a similar detail section taken on the line 4—4, Fig. 1.

The invention comprises a supporting frame 10 supported on a rear axle 11 carrying drive wheels 12. At its forward extremity the frame 10 is supported on a pair of casters 13 provided with suitable caster wheels 14. The caster wheels are caused to turn in unison by a tie bar 18 extending between cranks 19 on the casters 13. The machine is designed to be drawn by horses or a tractor, and the operating mechanism is driven from the drive wheels 12 through the medium of a drive sprocket 15, a sprocket chain 16, and a driven sprocket 17. The driven sprocket is secured to a countershaft 20 which extends across the frame 10 adjacent to its forward extremity and carries an elevator drive sprocket 21 and a topper-drive, bevel gear 22.

Within the frame 10 is a hinged frame 30 supported from the frame 10 on hinge pins 31. The hinged frame 30 hangs from a crank bar 32, the angle of which is controlled by means of a lift lever 33 positioned conveniently in front of the operator who is seated on a seat 34.

A conveyor or elevator is illustrated at 23. This elevator may be any of the usual types but is preferably of the open bar type, to allow the dirt and clods to fall from the beets, and is provided with cleats 24 for lifting the beets. The elevator bars pass over upper sprockets 25 and lower sprockets 26. The shaft of the lower sprockets extends beyond the elevator and carries a drive sprocket 27, from which a chain 28 passes to the elevator drive sprocket 21.

Immediately in front of the elevator 23 a pair of beet digging plows 29 are positioned. These plows may be of any of the usual types employed for digging beets and the like and are carried on two outwardly flaring arms 35 from the hinged frame 30. By this arrangement the depth that the plows dig can be regulated by means of the lever 33. The elevator 23 is also carried from the hinged frame 30, in brackets 36, and moves with the plows so that it will always be in proper position to receive the beets from the plows.

A slatted hopper 37 is positioned immediately under the rear of the elevator 23 so as to receive the beets therefrom. This hopper is formed of open bar construction so that the soil and dirt from the beets may fall therethrough and is provided with a door 38 at its rear. The door 38 is operated through the medium of a connecting rod 39 from a foot pedal 40 at the operator's position so that the contained beets may be released at desired intervals to form piles along the rows.

The topping mechanism comprises a dished, cutting disc 41 positioned so as to extend rearwardly and upwardly from the ground at an angle which will allow its curved cutting edge to enter the beets in a substantially horizontal position. At each side and forwardly of the cutting disc 41, guide discs 42 are placed. These discs are also dished and provided with outwardly extending serrated edges 43 which act to engage the beet stalks and climb upon the beet so as to accurately position the cutting disk 41 before it enters the beet.

All of the topping mechanism is carried from a floating frame 61 which is universally pivoted at 44 to a bracket 45 on the frame 10, so that it may move in any direction thereon. The floating frame 61 is normally held in alignment with the frame 10 by means of springs 46 which also act to support a portion of its weight. The cutting disc 41 is carried in a bracket 47 from the floating frame 61 and the guide discs 42 are carried therefrom in spring brackets 48.

The cutting disc 41 is driven by a vertical shaft 49 having a universal joint 50. The guide discs are driven by vertical shafts 51 having universal joints 52. Power is supplied to all of the discs from the countershaft 20 through the medium of the bevel drive gear 22 and a short stud shaft 53 which communicates through a pair of miter gears 54 with a universal shaft 55. The universal shaft is provided with a universal joint 56 positioned immediately over the universal pivot 44 of the floating frame 61.

The universal shaft 55 drives the vertical shaft 49 through a pair of miter gears 57. The two vertical shafts 51 are caused to rotate in unison but in opposite directions by means of a pair of spur gears 58 carried thereon. One of the shafts 51 is provided with an additional spur gear 59 which meshes with a spur gear 60 on the vertical shaft 49. This construction causes all of the discs to rotate simultaneously with the guide discs moving rearwardly at their adjacent edges.

In use, the machine is drawn along a row of beets so that the beets will pass longitudinally substantially under the center of the machine. As the tops of the beets strike the guide discs 42, the discs will, because of their rotation, climb upon the beet, raising the floating frame 61 and the serrated edges of the driving discs will engage the beet foliage and swing the floating frame so that the beet will pass centrally between the two guide discs. The cutting disc 41 has now been accurately positioned and enters the beet and cuts the top therefrom.

It is desired to call attention to the fact that the top will always be cut at a uniform depth determined by the position of the guide disc 41 with relation to the cutting edge of the cutting disc 42. Should the beet be unusually wide or have an unusually thick stem of foliage the guide discs 42 will be uniformly forced apart as they pass the stem owing to the fact that they are mounted in the resilient spring brackets 48, so that they will allow the beet to pass freely between them.

After the topping operation, the topped beets are engaged by the plows 29, raised from the ground and deposited on the elevator 23. The beet tops and foliage pass rearwardly between top guide plates 62 which direct them to one side of the machine. The top guide plates 62 extend from a point ahead of the guide discs 42 and converge rearwardly to assist in guiding the frame 61 so that the beet tops will pass between the guide discs 42 and between the shafts 51. To the rear of the cutting disc 41 the guide plates are provided with a floor 63 which supports the severed tops until they are deposited to one side of the machine. Each additional top entering between the guide plates will act to force the previous tops therethrough.

The outwardly extending serrated edges 43 on the guide discs 42 are very important since they allow the discs to extend inwardly over the beet top to a proper position for contacting with the foliage, so that the cutting mechanism may be properly aligned.

While a specific form of the improvement has been described and illustrated herein, it is desired to be understood that the same may be varied, within the scope of the appended claims, without departing from the spirit of the invention.

Having thus described the invention, what I claim and desire secured by Letters Patent is:—

1. A beet digging and topping machine comprising a substantially rectangular fixed frame; guide wheels at the forward extremity of said fixed frame; power wheels adjacent the rearward extremity of said fixed frame, all of said wheels acting to support said fixed frame in a substantially horizontal position; a vertically hinged frame within said fixed frame, the hinge point being adjacent the forward extremity of both said frames; a floating frame positioned within said hinged frame, said latter frame being hinged from said fixed frame for both vertical and horizontal movement; digging means carried by said hinged frame; guiding means carried by said floating frame; and topping means carried by said floating frame.

2. A beet digging and topping machine comprising: a substantially rectangular fixed frame; guide wheels at the forward extremity of said fixed frame; power wheels adjacent the rearward extremity of said fixed frame, all of said wheels acting to support said fixed frame in a substantially horizontal position; a vertically hinged frame within said fixed frame, the hinge point being adjacent the forward extremity of both said frames; a floating frame positioned within said hinged frame, said latter frame being hinged from said fixed frame for both vertical and horizontal movement; digging means carried by said hinged frame; guiding means carried by said floating frame; topping means carried by said floating frame; and spring means acting between said fixed frame and said floating frame to maintain the latter normally in alignment with the former.

3. A beet digging and topping machine comprising: a substantially rectangular fixed frame; guide wheels at the forward extremity of said fixed frame; power wheels adjacent the rearward extremity of said fixed frame, all of said wheels acting to support said fixed frame in a substantially horizontal position; a vertically hinged frame within said fixed frame, the hinge point being adjacent the forward extremity of both said frames; a floating frame positioned within said hinged frame, said latter frame being hinged from said fixed frame for both vertical and horizontal movement; digging means carried by said hinged frame; a pair of angularly placed guide discs carried by said floating frame so as to guide it over a row of beets; a rotary knife supported from said floating frame; and means for transmitting power from said power wheels to said floating frame for rotating said guide discs and said rotary knife.

4. A beet digging and topping machine comprising: a substantially rectangular fixed frame; guide wheels at the forward extremity of said fixed frame; power wheels adjacent the rearward extremity of said fixed frame, all of said wheels acting to support said fixed frame, in a substantially horizontal position; a vertically hinged frame within said fixed frame, the hinge point being adjacent the forward extremity of both said frames; a floating frame positioned within said hinged frame, said latter frame being hinged from said fixed frame for both vertical and horizontal movement; digging means carried by said hinged frame; a pair of angularly placed guide discs carried by said floating frame so as to guide it over a row of beets; a rotary knife supported from said floating frame; and means for transmitting power from said power wheels to said floating frame for rotating said guide discs and said rotary knife, said latter means comprising: a lateral shaft extending across said fixed frame adjacent the hinges between said fixed frame and said hinged and floating frames; means for driving said shaft from said power wheels; and a universal connection between said shaft and said fixed frame, said universal connection being arranged in alignment with the hinge between said fixed frame and said floating frame.

In testimony whereof, I affix my signature.

LEWIS W. EVERSMAN.